US012346656B2

(12) United States Patent
Lu et al.

(10) Patent No.: US 12,346,656 B2
(45) Date of Patent: Jul. 1, 2025

(54) FEATURE CROSSING FOR MACHINE LEARNING

(71) Applicant: Lemon Inc., Grand Cayman (KY)

(72) Inventors: Qingyi Lu, Los Angeles, CA (US); Yuan Gao, Los Angeles, CA (US); Hongyu Xiong, Los Angeles, CA (US); Han Wang, Los Angeles, CA (US); Bin Liu, Los Angeles, CA (US); Xiangyu Zeng, Los Angeles, CA (US); Rui Li, Los Angeles, CA (US); Yiqi Feng, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 423 days.

(21) Appl. No.: 17/737,918

(22) Filed: May 5, 2022

(65) Prior Publication Data

US 2023/0359824 A1 Nov. 9, 2023

(51) Int. Cl.
| | |
|---|---|
| *G06F 17/00* | (2019.01) |
| *G06F 16/901* | (2019.01) |
| *G06F 40/295* | (2020.01) |
| *G06F 40/30* | (2020.01) |
| *G06N 20/00* | (2019.01) |

(52) U.S. Cl.
CPC ........ *G06F 40/295* (2020.01); *G06F 16/9024* (2019.01); *G06F 40/30* (2020.01); *G06N 20/00* (2019.01)

(58) Field of Classification Search
CPC .... G06F 40/295; G06F 40/30; G06F 16/9024; G06N 20/00
USPC .......................................................... 704/9
See application file for complete search history.

(56) References Cited

U.S. PATENT DOCUMENTS

| | | |
|---|---|---|
| 2020/0057925 A1 | 2/2020 | Tang et al. |
| 2020/0175226 A1* | 6/2020 | Park ................. G06F 18/23213 |

FOREIGN PATENT DOCUMENTS

| | | |
|---|---|---|
| CN | 105160548 A | 12/2015 |
| CN | 105930425 A | 9/2016 |
| CN | 108416625 A | 8/2018 |
| CN | 112800234 A | 5/2021 |
| WO | WO 2021/095987 A1 | 5/2021 |

OTHER PUBLICATIONS

International Patent Application No. PCT/SG2023/050294; Int'l Search Report and the Written Opinion; dated Oct. 23, 2023; 10 pages.
Zhang et al.; "Recognition on Complex Objects by Hierarchical Attributes"; 10th Int'l Conf. on Modelling, Identification and Control; Jul. 2018; 6 pages.

* cited by examiner

*Primary Examiner* — Paul C McCord
(74) *Attorney, Agent, or Firm* — BakerHostetler

(57) ABSTRACT

Embodiments of the present disclosure relate to feature crossing for machine learning. According to example embodiments of the present disclosure, a method comprises determining a semantic correlation relationship between a plurality of feature categories, the semantic correlation relationship indicating respective degrees of semantic correlation between respective pairs of feature categories among the plurality of feature categories; obtaining at least two features classified in at least two of the plurality of feature categories for machine learning; and performing feature crossing on the at least two features based on the semantic correlation relationship.

20 Claims, 6 Drawing Sheets

FEATURE CROSSING FOR MACHINE LEARNING

BACKGROUND

Machine learning models, especially deep neural networks, have been used in artificial intelligence (AI) and computer vision fields. These models have shown promising performance in many tasks including prediction, recommendation, visual object recognition, natural language processing (NLP), and so on.

Before training a machine learning model, it may involve a feature construction stage to determine a set of features to be extracted or considered in the machine learning model. In many cases, there may be various types of features that can be directly extracted from raw input, such as input texts, and those features can be used for model processing. In order to achieve better model performance, it is sometimes desired to select two or more features for feature crossing and provide the crossed features for further model processing.

BRIEF DESCRIPTION OF THE DRAWINGS

Through the following detailed descriptions with reference to the accompanying drawings, the above and other objectives, features and advantages of the example embodiments disclosed herein will become more comprehensible. In the drawings, several example embodiments disclosed herein will be illustrated in an example and in a non-limiting manner, where.

DETAILED DESCRIPTION

Figure 1:
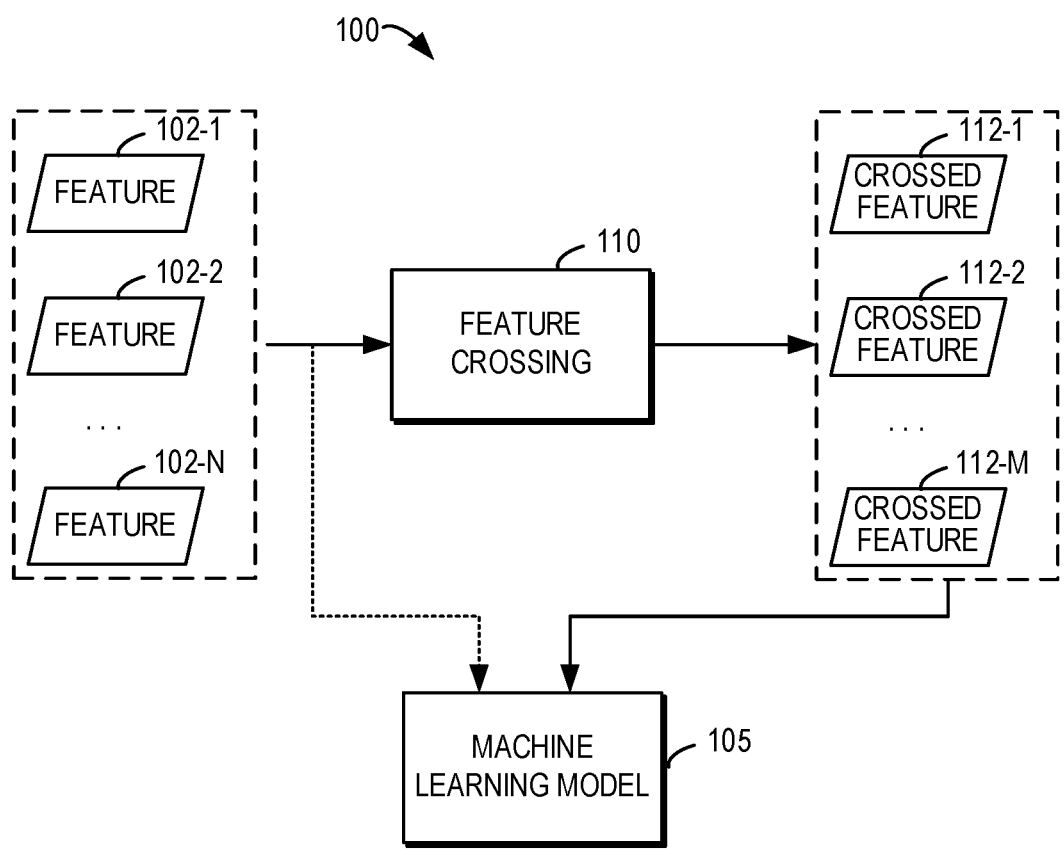
FIG. 1 illustrates a block diagram of an environment in which the embodiments of the present disclosure can be implemented.

Principle of the present disclosure will now be described with reference to some embodiments. It is to be understood that these embodiments are described only for purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for purpose of describing particular embodiments only and is not intended to be limiting example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used herein, the term "model" is referred to as an association between an input and an output learned from training data, and thus a corresponding output may be generated for a given input after the training. The generation of the model may be based on a machine learning technique. The machine learning techniques may also be referred to as artificial intelligence (AI) techniques. In general, a machine learning model can be built, which receives input information and makes predictions based on the input information. For example, a classification model may predict a class of the input information among a predetermined set of classes. As used herein, "model" may also be referred to as "machine learning model", "learning model", "machine learning network", or "learning network," which are used interchangeably herein.

Generally, machine learning may usually involve three stages, i.e., a training stage, a validation stage, and an application stage (also referred to as an inference stage). At the training stage, a given machine learning model may be trained (or optimized) iteratively using a great amount of training data until the model can obtain, from the training data, consistent inference similar to those that human intelligence can make. During the training, a set of parameter values of the model is iteratively updated until a training objective is reached. Through the training process, the machine learning model may be regarded as being capable of learning the association between the input and the output (also referred to an input-output mapping) from the training data. At the validation stage, a validation input is applied to the trained machine learning model to test whether the model can provide a correct output, so as to determine the performance of the model. Generally, the validation stage may be considered as a step in a training process, or sometimes may be omitted. At the application stage, the resulting machine learning model may be used to process a real-world model input based on the set of parameter values obtained from the training process and to determine the corresponding model output.

As mentioned above, feature crossing is desired in order to achieve better model performance. The feature crossing may be a stage prior to model training, as the result of the feature crossing indicates the specific features to be considered within the model to be trained.

FIG. 1 illustrates a block diagram of an environment 100 in which the embodiments of the present disclosure can be implemented. In the environment 100, a machine learning model 105 is to be trained at a training stage or to be applied at an application stage.

The machine learning model 105 may be of any machine learning or deep learning architectures, for example, a neural network. The output generated by a layer and conveyed to a next layer in the machine learning model 105 generally referred to as "features." In practical systems, the machine learning model 105 may be configured to process a model input and generate a model output indicating a prediction or classification result for the model input. The task implemented by the machine learning model 105 may be defined depending on practical applications where the machine learning model 105 is applied.

At either of the training stage, the validation stage, or the application stage, the input to the machine learning model 105 is generally feature information, so that the machine learning model 105 may process or analyze the feature information to derive a model output. For example, at the training stage or the validation stage, the input feature information may be obtained from training data or validation data, while at the application stage, the input feature information may be obtained from some real-world data to be processed.

In some cases, to achieve better model performance, it is desired to perform feature crossing on some features that are directly expected from raw input and apply the crossed features to be processed by the machine learning model 105. In this case, a feature crossing stage 110 is involved in the environment 100, to determine features to be input to the machine learning model 105. In this example, it is assumed that a plurality of features 102-1, 102-2, . . . , 102-N are extracted from raw input, where N is an integer larger than one. For purpose of discussion, the features 102-1, 102-2, . . . , 102-N are collectively or individually referred to as features 102.

A feature may be a real-valued multi-dimensional vector, also called a feature representation, a feature vector, or a latent vector. The features 102 may be extracted from some raw data. The types of features 102 to be extracted may depend on the task to be implemented by the machine learning model 105. For example, in the task of providing a machine learning model for predicting a house price, some features about a house size, orientation, floor information, and a house location, such as "three-room one hall," "southeast," "top floor," and a specific geographical house location may be extracted for use in predicting the house price.

At the feature crossing stage 110, two or more features may be selected from the N features 102 and a feature crossing operation may be applied to the two or more selected features, to generate a crossed feature. It is assumed that after the feature crossing stage, one or more crossed features 112-1, 112-2, . . . , 112-M may be determined, where M is an integer larger than or equal to one. It is noted that although multiple crossed features are depicted, there may be only one or two crossed features. For purpose of discussion, the crossed features 112-1, 112-2, . . . , 112-M are collectively or individually referred to as crossed features 112. The crossed features 112 may be provided as inputs to the machine learning model 105. In some cases, some features 102 which are not crossed with other features 102 or the whole or partial set of features 102 may be additionally input to the machine learning model 105.

A feature crossing operation, also referred to as a feature combination operation, is to apply a logic combination operation on two or more features, to generate a crossed feature. The logical combination operation may be any of various types of operations on vectors. Some examples of the logical combination operation may include, but are not limited to, one or more of a multiplication operation, a summing operation, a division operation, or the like. The feature crossing operation used may depend on the applications for the machine learning model.

As compared with the individual features 102, a crossed feature 112 may be more beneficial in providing information for the machine learning model 105 to derive the model output. As an example, in the task of predicting a house price, a feature about longitude information or a feature about altitude information of a house cannot provide discriminative information for the machine learning model to determine the house price. However, by applying a feature crossing operation on the two features, such as applying a multiplication operation, the resulting crossed feature (represented as "[longitude×altitude]") may be more useful in deciding the house price.

Traditionally, the features to be crossed are manually configured. However, as the number of extracted features is increasing for some complicated tasks, the manual configuration is a time-consuming exercise and it is not always easy to manually differentiate which features are to be crossed.

Currently, there has been proposed to directly input the extracted features into the deep learning model, to generate respective embeddings of the features, and then require the deep learning model to learn, through the training process, to select the embeddings to be crossed. However, in this case, it is hard to explicitly explain which the features are crossed, so there may be some unexpected noise introduced in the machine learning process and the result of the feature crossing cannot be generalized in other tasks of machine learning. In addition, this solution may require the machine learning to have a complicated structure and a large model depth so that the crossing operation can be implemented. Therefore, this solution is not suitable for some relatively simple models, such as a logistic regression model, a factorization machine (FM) model, or the like.

According to embodiments of the present disclosure, there is proposed a solution for automated feature crossing. According to this solution, the feature crossing can be implemented based on semantic knowledge about a plurality of feature categories. Specifically, a semantic correlation relationship between the plurality of feature categories is determined for use. Different features can be classified into the plurality of feature categories. The semantic correlation relationship indicates respective degrees of semantic correlation between respective pairs of feature categories among the plurality of feature categories. When two or more features in some of the feature categories are obtained, the semantic correlation relationship can be used to determine whether a feature crossing operation can be applied on those features or not. It is generally expected to apply the feature crossing operation on features that are classified in feature categories that are indicated as having a strong correlation.

Through this solution, the feature crossing can be automatically implemented based on the semantic correlation relationship for the feature categories. Thus, the cost for feature crossing is reduced. Instead of training a deep learning model for feature crossing, the feature crossing in the present disclosure can be performed before inputting the features or crossed features into a machine learning model to be trained or applied. Accordingly, the feature crossing in the present disclosure can be applied to machine learning models with either simple or complicated structures, and the generalization capability of the models can be maintained with such feature crossing.

Some example embodiments of the present disclosure will be described in detail below with reference to the accompanying figures.

Figure 2:
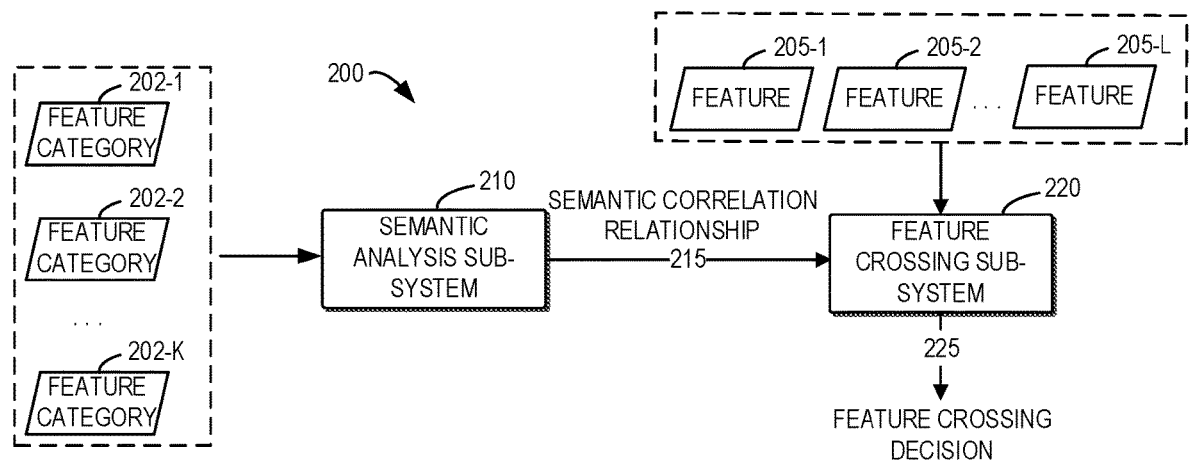
FIG. 2 illustrates a block diagram of a feature crossing system in accordance with some example embodiments of the present disclosure.

Reference is first made to FIG. 2, which illustrates a block diagram of a feature crossing system 200 in accordance with some example embodiments of the present disclosure. As illustrated, the feature crossing system 200 includes a semantic analysis sub-system 210 and a feature crossing sub-system 220.

The semantic analysis sub-system 210 is configured to apply semantic analysis on a plurality of feature categories 202-1, 202-2, 202-K, where K is an integer larger than one. For purpose of discussion, the feature categories 202-1, 202-2, . . . , 202-K are collectively or individually referred to as feature categories 202. The feature categories 202 define respective feature fields to be considered in one or more machine learning models for one or more corresponding tasks.

Still take the model for predicting a house price as a specific example. A plurality of feature categories including "house size," "orientation," "floor information," and "house location" may be considered in the model. For a certain house, specific features in those feature categories may be extracted from a piece of house information about the house, such as "three-room one hall," "southeast," "top floor," and a specific geographical house location. Those features may be taken as specific feature (or feature values) classified in those feature categories.

In embodiments of the present disclosure, the semantic analysis performed by the semantic analysis sub-system 210 is to determine a semantic correlation relationship 215 between the plurality of feature categories 202. The semantic correlation relationship 215 indicates respective degrees of semantic correlation between respective pairs of feature categories among the plurality of feature categories. In some embodiments, a semantic correlation between two of the plurality of feature categories may be indicated in the semantic correlation relationship 215. In some embodiments, a semantic correlation between more than two of the plurality of feature categories may be indicated in the semantic correlation relationship 215.

A high degree of semantic correlation between the feature categories may indicate that those feature categories are strongly correlated with one another in semantic. Accordingly, the features classified in those feature categories may be semantically correlated with one another and thus can be crossed with one another to generate a crossed feature for use in the model. In some examples, a degree of semantic correlation may be determined as a value selected from a specific range, such as a value within a range of 0 to 1. In some other examples, a degree of semantic correlation may be determined as a certain level among a plurality of predetermined levels where a higher level may indicate a higher degree of semantic correlation.

The feature crossing sub-system 220 is configured to perform feature crossing on a plurality of available features 205-1, 205-2, . . . , 205-L based on the semantic correlation relationship 215, where L is an integer larger than one. For purpose of discussion, the features 205-1, 205-2, . . . , 205-L are collectively or individually referred to as features 205. The features 205 are generally used for machine learning. For example, the features 205 may be considered in a machine learning model (e.g., the machine learning model 105 in FIG. 1) to be trained, validated, or applied.

Specifically, the feature crossing sub-system 220 obtains two or more features 205. If the features 205 are classified in two or more of the plurality of feature categories, the feature crossing sub-system 220 performs feature crossing on those features 205 based on the semantic correlation relationship 215. The feature crossing sub-system 220 may determine whether a feature crossing operation can be applied on those features 205 or not. The feature crossing sub-system 220 may provide a feature crossing decision 225 on the plurality of features 205, to indicate which features 205 can be crossed into a crossed feature(s).

Some embodiments related to determination of the semantic correlation relationship 215 by the semantic analysis sub-system 210 are first described, and then the embodiments related to the usage of the semantic correlation relationship 215 by the feature crossing sub-system 220.

The semantic analysis sub-system 210 may apply various semantic analysis techniques on the plurality of feature categories 202, to calculate the degrees of semantic correlation between those feature categories.

Figure 3A:
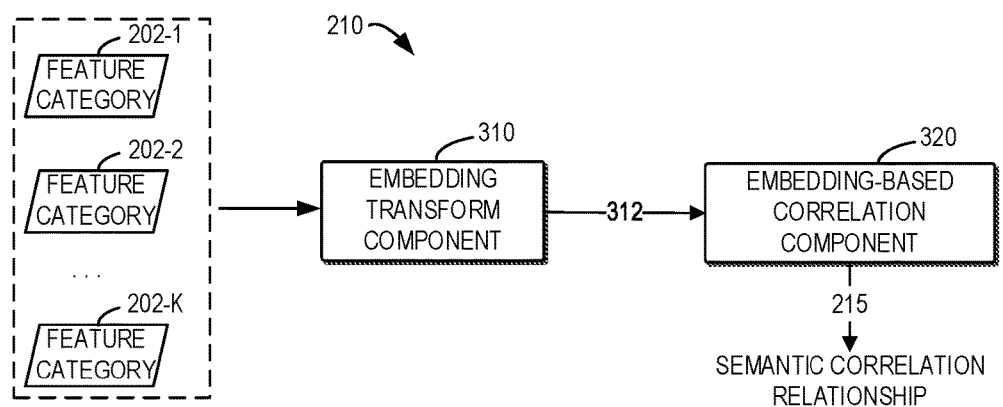
FIG. 3A illustrates a block diagram of the semantic analysis sub-system in the feature crossing system of FIG. 2 in accordance with some example embodiments of the present disclosure.

FIG. 3A illustrates a block diagram of the semantic analysis sub-system 210 in the feature crossing system 200 of FIG. 2 in accordance with some example embodiments of the present disclosure. As illustrated in FIG. 3A, the semantic analysis sub-system 210 comprises an embedding transform component 310 and an embedding-based correlation component 320.

The embedding transform component 310 is configured to transform respective names of the plurality of feature categories 202 into a plurality of embedding representations 312 using a language model. An embedding representation, also called an "embedding", is similar to a feature and is also represented as a real-valued multi-dimensional vector.

The names of the plurality of feature categories 202 may be represented by a natural language. The language model is trained to transform a word sequence in a natural language into an embedding in a vector space. The language model may learn distributed representations for words in the natural language, and may embed a vocabulary into a smaller dimensional vector space that models a probability function for word sequences, expressed in terms of these representations. As a result, the embedding representations can allow vector operations between words that mirror their semantic and syntactic relationships. In other words, the embedding representations of the feature categories 202 can indicate their semantic and syntactic relationships.

Various types of language models, either currently available or to be developed in the future, can be applied by the embedding transform component 310. Some examples of the language model may include, but are not limited to, the pre-trained word2vec model, the Glove model, the sense2vec model, the fastText model, the seq2seq model, an attention-based model, or the Transformer model.

The embedding-based correlation component 320 is configured to determine the respective degrees of semantic correlation between the plurality of feature categories 202 based on the plurality of embedding representations 312. The embedding-based correlation component 320 may determine respective similarities between the plurality of embedding representations 312 and determine the degrees of semantic correlation based on the respective similarities, to obtain the semantic correlation relationship 215. In some embodiments, the embedding-based correlation component 320 may determine a degree of semantic correlation between each pair of feature categories among the plurality of feature categories 202.

A similarity between two embedding representations 312 may be measured by calculating a distance between the two embedding representations 312 which are vectorized representations. Any algorithm applicable for calculating vector distances may be utilized to calculate the distance between the two embedding representations 312, such as the Euclidean distance. A relatively large distance may indicate a relatively small similarity between the two embedding representations 312, and thus a relatively low degree of semantic correlation between the corresponding two feature categories 202.

Figure 3B:
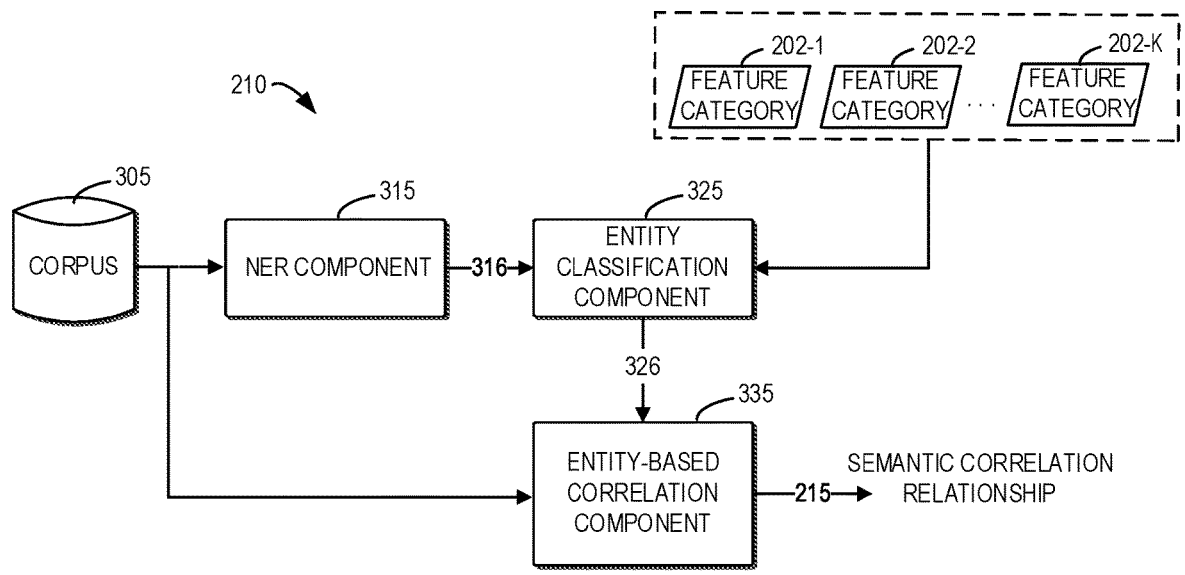
FIG. 3B illustrates a block diagram of the semantic analysis sub-system in the feature crossing system of FIG. 2 in accordance with some further example embodiments of the present disclosure.

FIG. 3B illustrates a block diagram of the semantic analysis sub-system 210 in the feature crossing system 200 of FIG. 2 in accordance with some further example embodiments of the present disclosure. In these embodiments, the semantic analysis sub-system 210 may learn prior semantic knowledge from a corpus by applying the named entity recognition (NER) technique, to implement the semantic analysis.

As illustrated in FIG. 3B, the semantic analysis sub-system 210 comprises a NER component 315, an entity classification component 325, and an entity-based correlation component 335.

The NER component 315 is configured to identify a set of named entities 316 from a corpus 305. The corpus 305 may comprise a large amount of digital text information, including a plurality of text sequences. As used herein, a text sequence may be of any textual size in the corpus 305. In some other examples, a text sequence may be a sentence, a phrase, a paragraph, or the like.

A named entity, such as a person, place, organization, object or other named entity may be a member of a class or type. For example, a place called "Mexico City" may be an example of the class "city"; and an organization called "XX Limited" may be an example of the class "organization".

The corpus 305 may comprise text information related to the plurality of feature categories 202. For example, if features classified in at least some of feature categories 202 are used in a model for predicting the house price, the corpus 305 may comprise house-related information. The corpus 305 may be collected from various available data sources from which the related information can be extracted.

In some embodiments, the NER component 315 may apply a NER model to perform automated entity recognition. The NER model may be any type of a trained machine learning model or a trained deep learning model that is suitable for named entity recognition.

The training of the NER model may be performed based on a training dataset which may comprise a plurality of sample text sequences and labeling information (sometimes referred to as "first labeling information"). In some embodiments, some pre-processing operations may be performed on the sample text sequences, including deleting the punctuation, deleting some modal particles, and/or any other processing operations. The labeling information for the sample text sequences may indicate named entities occurred in the sample text sequences. With such training dataset and after the training process, the NER model may be capable of identifying named entities from text sequences using the named entity recognition model.

With the trained NER model, the NER component 315 may apply text information in the corpus 305, such as text sequences, into the NER model, to obtain the recognized named entities. In some embodiments, before inputting the text sequences in the corpus 305 into the NER model, some pre-processing operations may be applied, such as deleting the punctuation, deleting some modal particles, and/or any other processing operations, which are similar to those pre-processing operations applied in the training process.

The entity classification component 325 is configured to classify the set of named entities 316 into a plurality of entity clusters 326. In some embodiments, the entity clustering may be based on embedding representations of the named entities. Specifically, the entity classification component 325 may apply a language model to transform the set of named entities 316 into a set of embedding representations. The language model applied here may be similar to the one used by the embedding transform component 310 as discussed above. Thus, its detailed description is omitted here.

The entity classification component 325 may further cluster the set of named entities 316 based on respective similarities between the set of embedding representations of the named entities. The similarity between any two embedding representations may be determined in a similar way as described above in the embedding transform component 310. The entity classification component 325 may any clustering algorithm to cluster the set of named entities 316. After the clustering, named entities with low similarities between their embedding representations may be cluster into one entity cluster 326.

In some embodiments, during the clustering, the number of the entity clusters 326 may be equal to the number of the feature categories 202. Then each of the plurality of entity clusters 326 may be associated with one of the plurality of feature categories 202.

In some embodiments, the entity classification component 325 may apply a classification model to classify the set of named entities 316 into the plurality of entity clusters 326. The classification model may be any type of a trained machine learning model or a trained deep learning model that is suitable for entity classification.

The training of the classification model may be performed based on a training dataset which may comprise a plurality of sample named entities and labeling information (sometimes referred to as "second labeling information"). The labeling information may indicate a classification result of the plurality of sample named entities into the plurality of entity clusters (or the associated feature categories). With such training dataset and after the training process, the classification model may be capable of labeling the named entities with the plurality of entity clusters 326 or the associated feature categories 202.

In some embodiments, the classification model may be integrated into the NER model. For example, the NER model may be trained to not only identify named entities from text sequences, but also label the entity cluster or feature category of each of the identified named entities. To achieve such a NER model, the labeling information in the training dataset may indicate both the named entities in the sample text sequences and the entity clusters or the associated feature categories to which the named entities are classified.

Figure 4:
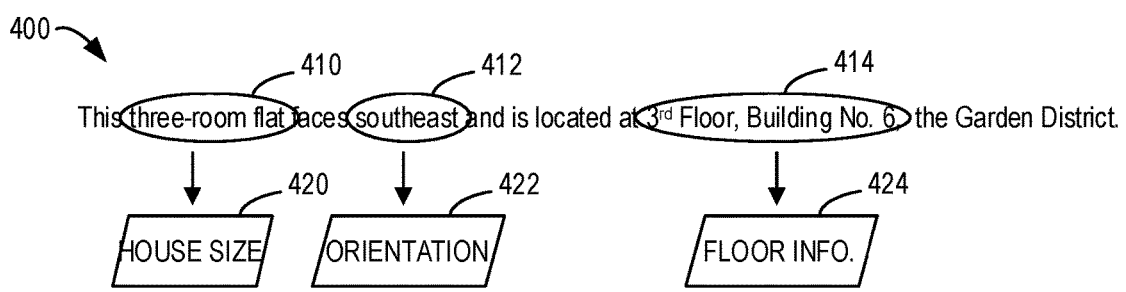
FIG. 4 illustrates an example of named entity recognition and entity labeling in accordance with some example embodiments of the present disclosure.

FIG. 4 illustrates an example of named entity recognition and entity labeling in accordance with some example embodiments of the present disclosure. A sentence 400 is provided in FIG. 4. By applying the named entity recognition, a named entity 410 "three-room flat," a named entity 412 "southeast," and a named entity "$3^{rd}$ Floor, Building No. 6" are recognized from the sentence 400. In addition, the named entity 410 may be labeled with a feature category 420 "house size"; the named entity 412 may be labeled with a feature category 422 "orientation"; and the named entity 414 may be labeled with a feature category 424 "floor information."

Figure 5:
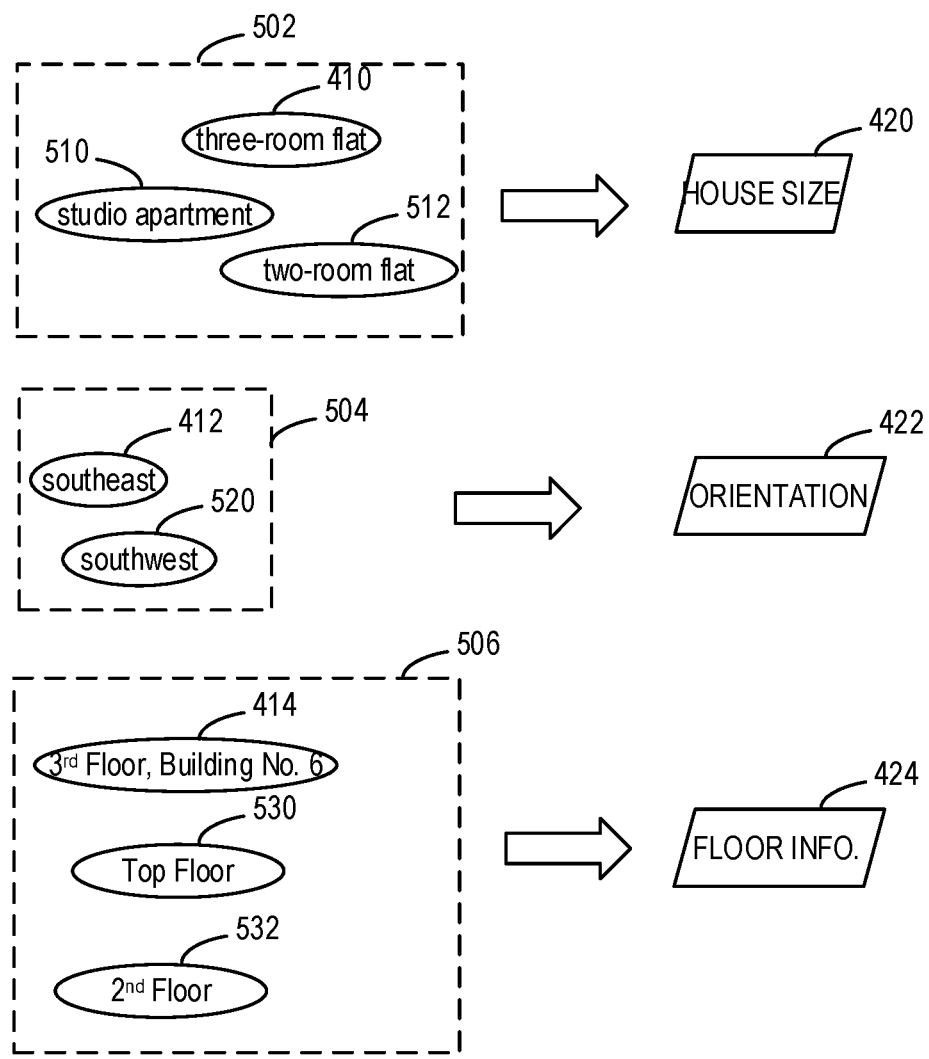
FIG. 5 illustrates an example of entity classification in accordance with some example embodiments of the present disclosure.

After the set of named entities 316 are all identified from the corpus 305, those named entities 316 may be clustered by the entity classification component 325. FIG. 5 illustrates an example of entity classification in accordance with some example embodiments of the present disclosure. In this example, depending on the similarities between the named entities, the named entity 410 may be classified with a named entity 510 "studio apartment" and a named entity 512 "two-room flat" into an entity cluster 502, which is associated with the feature category 420 "house size". In addition, the named entity 412 may be classified with a named entity 520 "southwest" into an entity cluster 504, which is associated with the feature category 422 "orientation"; and the named entity 414 may be classified with a named entity 530 "top floor" and a named entity 532 "$2^{nd}$ floor" into an entity cluster 506, which is associated with the feature category 424 "floor information."

The entity-based correlation component 335 is configured to determine the semantic correlation relationship 215 based on the classification result from the entity classification component 325 by referring to the corpus 305. In these embodiments, through the analysis on the corpus 305, the semantic correlations between the feature categories 202 can be better explored based on the semantic knowledge learned from the corpus 305.

Specifically, the entity-based correlation component 335 may determine the respective degrees of semantic correlation between the plurality of feature categories 202 based on relative positioning of the plurality of entity clusters 326 within the plurality of text sequences in the corpus 305.

The relative positioning of two or more different named entities within two or more different entity clusters in the text sequences may indicate whether those named entities are co-cocurated in same text sequences, or in other words, whether those named entities are frequently mentioned together in same text sequences.

In some embodiments, for any two entity clusters, the entity-based correlation component 335 may determine a frequency of co-occurrence of a first named entity classified in one of the entity clusters in relation to a second named entity classified in the other one of the entity clusters within same text sequences of the corpus 305. For example, among a total number of 10,000 sentences in the corpus, the named entity 410 in the entity cluster 502 and the named entity 412 in the entity cluster 504 as illustrated in FIG. 5 are co-occurred in 8000 sentences. In this case, the frequency of co-occurrence may be determined as 0.8. Of course, in other examples, the frequency of co-occurrence may be indicated by the number of co-occurrences of the two named entities. The entity-based correlation component 335 may determine, based on the frequency of co-occurrences, the degree of semantic correlation between two feature categories 202 associated with the two entity clusters.

In some embodiments, the frequency of co-occurrence of the two or more named entities classified in any two or more entity clusters may be determined, and an overall frequency of co-occurrence may be determined based on the respective frequencies of co-occurrence, for example, based on an average of the respective frequencies of co-occurrence. In some embodiments, a higher degree of semantic correlation may be determined for two feature categories 202 if a higher overall frequency of co-occurrence is determined for two entity clusters associated with the two feature categories 202. In some examples, the degree of semantic correlation may be determined as the overall frequency of co-occurrence.

In some embodiments, the entity-based correlation component 335 may determine a frequency of co-occurrence of more than two named entities in different entity clusters, for example, by determining how frequently those named entities are co-occurred in same text sequences. In this case, the entity-based correlation component 335 may determine a degree of semantic correlation between more than two feature categories associated with the more than two named entities based on the determined frequency of co-occurrence.

In some embodiments, with the respective degrees of semantic correlation determined, the semantic correlation relationship 215 may be obtained by the embedding-based correlation component 320 or the entity-based correlation component. The semantic correlation relationship 215 may be provided or stored for following use. The semantic correlation relationship 215 may be generated in any form that can indicate the respective degrees of semantic correlation. In some embodiments, the semantic correlation relationship 215 may represented as a relationship graph. For example, the relationship graph may be a Directed Acyclic Graph (DAG) with vertexes and edges connecting the vertexes. The vertexes may represent the plurality of feature categories 202. An edge connecting two vertexes may indicate a degree of semantic correlation between two feature categories 202 represented by two vertexes connected by the edge. The relational graph may clearly show the semantic correlations between those feature categories.

Figure 6:
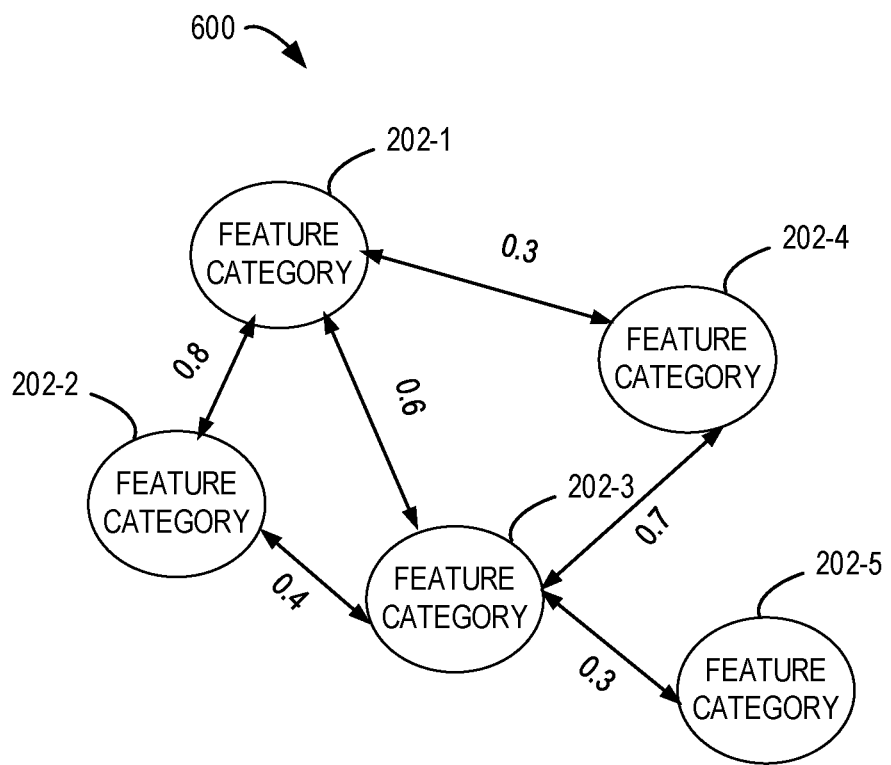
FIG. 6 illustrates an example relational graph for feature categories in accordance with some example embodiments of the present disclosure.

FIG. 6 illustrates an example relational graph 600 for feature categories in accordance with some example embodiments of the present disclosure. The relational graph 600 may be considered as an example of the semantic correlation relationship 215. As illustrated, the vertexes in the relational graph 600 represents the feature categories 202-1, 202-2, 202-3, 202-4, and 202-5, respectively. The values on the edges indicate the degrees of semantic correlations, where a value on one edge indicate the degree of semantic correlation between two feature categories 202 connected by this edge.

As mentioned above, the semantic correlation relationship 215 may be provided for feature crossing by the feature crossing sub-system 220 in the system 200. Reference will be made back to FIG. 2. For the plurality of available features 205, the feature crossing sub-system 220 may determine the feature crossing decision 225 by determining which features 205 can or cannot be crossed to generate a crossed feature(s). The number of the features 205 (e.g., L) may be equal to or different from the number of the feature categories 202. Those features 205 may be used to train one or more machine learning models.

In some embodiments, if the features 205 are classified in the feature categories 202, respectively, the feature crossing sub-system 220 may determine whether any two or more features 205 can be crossed with each other. In some embodiments, the number of features to be crossed may be specified. In some embodiments, it may be expected to traverse all possible combinations of features 205 to determine whether the features in each of the combinations can be crossed.

In some embodiments, for any given two features 205, the feature crossing sub-system 220 may determine, from the semantic correlation relationship 215, a target degree of semantic correlation between two feature categories into which the two features 205 are classified. For example, depending on the relational graph 600 in FIG. 6, the feature crossing sub-system 220 determine a target degree of semantic correlation between the feature categories 202-1 and 202-2 as 0.8.

In some embodiments, if the semantic correlation relationship 215 indicates the respective degrees of semantic correlations between any two pairs of feature categories, and the feature crossing sub-system 220 needs to determine whether feature crossing can be performed on more than two features 205, then the feature crossing sub-system 220 may determine, from the semantic correlation relationship 215, at least two degrees of semantic correlation between at least two pairs of feature categories among the more than two feature categories 202. The feature crossing sub-system 220 may then determine a target degree of semantic correlation between the corresponding more than two feature categories 202 based on the at least two degrees of semantic correlation. For example, the feature crossing sub-system 220 may determine the target degree of semantic correlation by combining the at least two degrees of semantic correlation. The combining may comprise a multiplication of the at least two degrees of semantic correlation.

As an example, for three features classified in the three feature categories 202-1, 202-2 and 202-3, respective degrees of semantic correlation between any two of the three feature categories may be extracted from the relational graph 600, such as 0.8 for the feature categories 202-1 and 202-2, 0.4 for the feature categories 202-2 and 202-3, and 0.6 for the feature categories 202-1 and 202-3. A target degree of semantic correlation for the three feature categories 202-1, 202-2 and 202-3 may be determined as a product of the three degrees of semantic correlation, e.g., 0.8*0.4*0.6=0.192.

For any two or more feature categories 202, the feature crossing sub-system 220 may compare the target degree of semantic correlation with a threshold degree of semantic correlation. If the target degree of semantic correlation exceeds the threshold degree of semantic correlation, the feature crossing sub-system 220 may apply a feature crossing operation on the two or more features 205 classified in the two or more feature categories 202, to generate a crossed feature. Otherwise, if the target degree of semantic correlation is below the threshold degree of semantic correlation, the feature crossing sub-system 220 may not apply the feature crossing operation on the at two or more features 205.

The threshold degree of semantic correlation may be configured depending on the applications. In some embodiments, the threshold degree of semantic correlation may be varied for different numbers of features to be crossed. For example, the threshold degree of semantic correlation used for deciding the feature crossing on two features may be different from the threshold degree of semantic correlation used for deciding the feature crossing on three features. In some embodiments, the threshold degree of semantic correlation may be a specified value, or may be varied if an expected total number of combinations of features to be crossed is set. For example, if it is expected to perform feature crossing on up to six pairs of features, the threshold degree of semantic correlation may be set to allow the feature crossing sub-system 220 may perform the feature crossing operation on six pairs of features with the top six target degrees of semantic correlations among all the possible pairs of features. The scope of the present disclosure is not limited in the regard of setting the threshold degree of semantic correlation.

It should be appreciated that the feature crossing system 200 semantic analysis sub-system 210 and/or the feature crossing sub-system 220 may be integrated in a computing system/device or may be separated in different computing systems/devices. The components in the semantic analysis sub-system 210 and/or the feature crossing sub-system 220 may be implemented in software, hardware, middleware, or any combination thereof.

Figure 7:
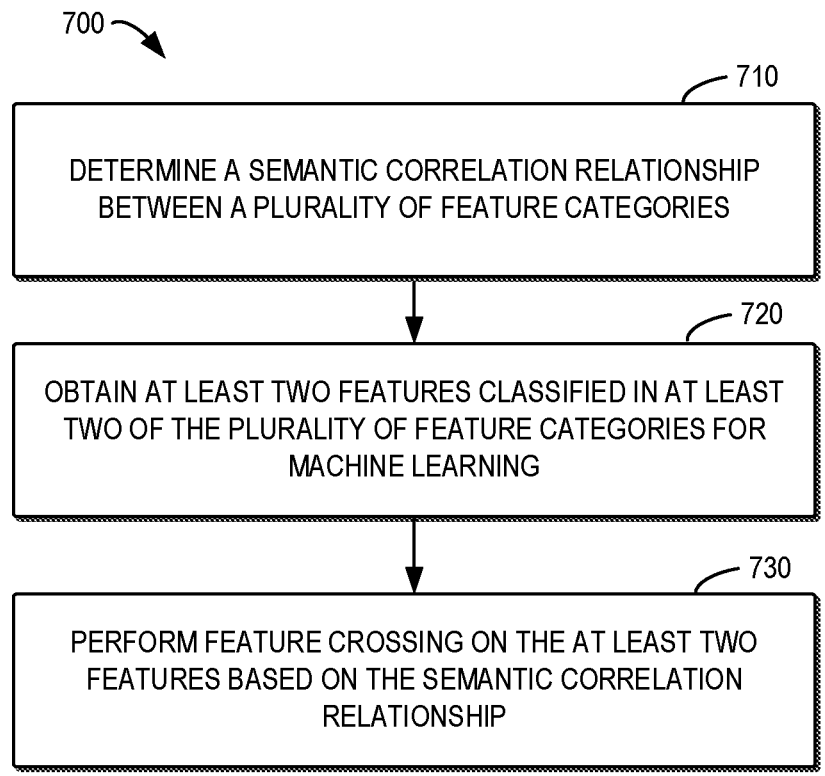
FIG. 7 illustrates a flowchart of a process for feature crossing in accordance with some example embodiments of the present disclosure.

FIG. 7 illustrates a flowchart of a process 700 for feature crossing in accordance with some example embodiments of the present disclosure. The process 700 may be implemented at the feature crossing system 200 as illustrated in FIG. 2.

At block 710, the feature crossing system 200 determines a semantic correlation relationship between a plurality of feature categories. The semantic correlation relationship indicates respective degrees of semantic correlation between respective pairs of feature categories among the plurality of feature categories.

At block 720, the feature crossing system 200 obtains at least two features classified in at least two of the plurality of feature categories for machine learning. At block 730, the feature crossing system 200 performs feature crossing on the at least two features based on the semantic correlation relationship.

In some embodiments, the semantic correlation relationship is determined by transforming respective names of the plurality of feature categories into a plurality of embedding representations using a language model; and determining the respective degrees of semantic correlation based on respective similarities between the plurality of embedding representations.

In some embodiments, the semantic correlation relationship is determined by identifying a set of named entities from a corpus, the corpus comprising a plurality of text sequences; classifying the set of named entities into a plurality of entity clusters, each of the plurality of entity clusters being associated with one of the plurality of feature categories; and determining the respective degrees of semantic correlation between the plurality of feature categories based on relative positioning of the plurality of entity clusters within the plurality of text sequences.

In some embodiments, the set of named entities are identified by: obtaining a named entity recognition model, the named entity recognition model being trained with a plurality of sample text sequences and first labeling information indicating named entities occurred in the plurality of sample text sequences; and identifying the set of named entities using the named entity recognition model.

In some embodiments, the set of named entities are classified by: transforming the set of named entities into a set of embedding representations using a language model; and clustering the set of named entities based on respective similarities between the set of embedding representations.

In some embodiments, the set of named entities are classified by: obtaining a classification model, the classification model being trained with a plurality of sample named entities and second labeling information, the second labeling information indicating a classification result of the plurality of sample named entities into the plurality of entity clusters; and classifying the set of named entities using the classification model.

In some embodiments, the respective degrees of semantic correlation based on the relative positioning of the plurality of named entities within the plurality of text sequences are determined by: for a first entity cluster and a second entity cluster of the plurality of clusters, determining a frequency of co-occurrence of a first named entity classified in the first entity cluster in relation to a second named entity classified in the second entity cluster within same text sequences of the plurality of text sequences; and determining, based on the frequency of co-occurrence, a degree of semantic correlation between a first feature category associated with the first entity cluster and a second feature category associated with the second entity cluster.

In some embodiments, the semantic correlation relationship is determined by: generating a relational graph to indicate the semantic correlation relationship, the relational graph comprising a plurality of vertexes representing the plurality of feature categories, and a plurality of edges connecting the plurality of vertexes, each of the plurality of edges indicating a degree of semantic correlation between two feature categories represented by two vertexes connected by the edge.

In some embodiments, the feature crossing is performed by: determining a target degree of semantic correlation between the at least two feature categories based on the semantic correlation relationship; and in accordance with a determination that the target degree of semantic correlation exceeds a threshold degree of semantic correlation, applying a feature crossing operation on the at least two features to generate a crossed feature; and in accordance with a determination that the target degree of semantic correlation is below the threshold degree of semantic correlation, ceasing to apply the feature crossing operation on the at least two features.

In some embodiments, the semantic correlation relationship indicates respective degrees of semantic correlation between respective pairs of feature categories among the plurality of feature categories. In some embodiments, the target degree of semantic correlation is determined by: in accordance with a determination that more than two features classified in more than two feature categories are obtained, determining, from the semantic correlation relationship, at least two degrees of semantic correlation between at least two pairs of feature categories among the more than two feature categories, and determining the target degree of semantic correlation by combining the at least two degrees of semantic correlation.

Figure 8:
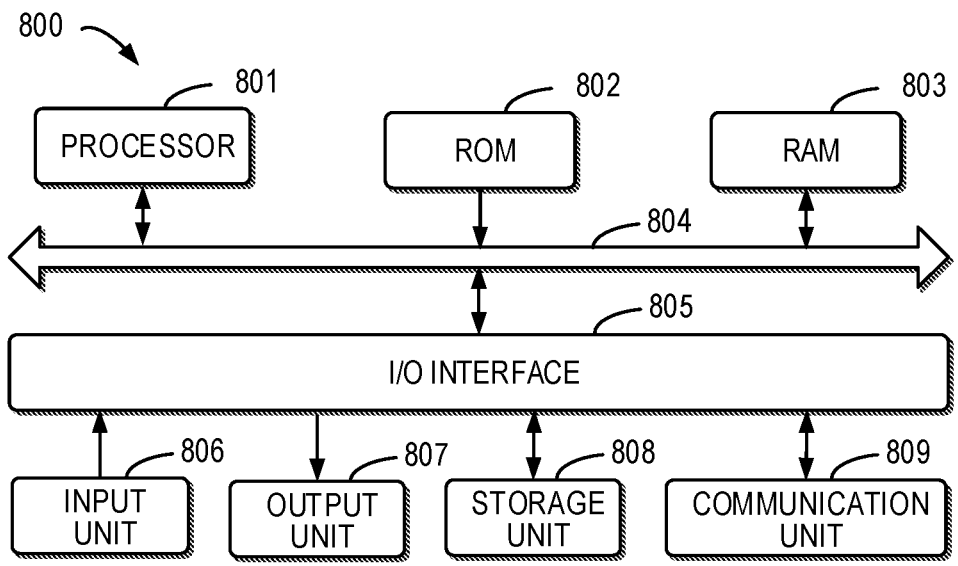
FIG. 8 illustrates a block diagram of an example computing system/device suitable for implementing example embodiments of the present disclosure.

FIG. 8 illustrates a block diagram of an example computing system/device 800 suitable for implementing example embodiments of the present disclosure. The feature crossing system 200 in FIG. 2 may be implemented as or included in the system/device 800. In some embodiments, the semantic analysis sub-system 210 or the feature crossing sub-system 220 may be implemented as or included in the system/device 800.

The system/device 800 may be a general-purpose computer, a physical computing device, or a portable electronic device, or may be practiced in distributed cloud computing environments where tasks are performed by remote processing devices that are linked through a communication network. The system/device 800 can be used to implement any of the processes described herein.

As depicted, the system/device 800 includes a processor 801 which is capable of performing various processes according to a program stored in a read only memory (ROM) 802 or a program loaded from a storage unit 808 to a random-access memory (RAM) 803. In the RAM 803, data required when the processor 801 performs the various processes or the like is also stored as required. The processor 801, the ROM 802 and the RAM 803 are connected to one another via a bus 804. An input/output (I/O) interface 805 is also connected to the bus 804.

The processor 801 may be of any type suitable to the local technical network and may include one or more of the following: general purpose computers, special purpose computers, microprocessors, digital signal processors (DSPs), graphic processing unit (GPU), co-processors, and processors based on multicore processor architecture, as non-limiting examples. The system/device 800 may have multiple processors, such as an application-specific integrated circuit chip that is slaved in time to a clock which synchronizes the main processor.

A plurality of components in the system/device 800 are connected to the I/O interface 805, including an input unit 806, such as a keyboard, a mouse, or the like; an output unit 807 including a display such as a cathode ray tube (CRT), a liquid crystal display (LCD), or the like, and a loudspeaker or the like; the storage unit 808, such as disk and optical disk, and the like; and a communication unit 809, such as a network card, a modem, a wireless transceiver, or the like. The communication unit 809 allows the system/device 800 to exchange information/data with other devices via a communication network, such as the Internet, various telecommunication networks, and/or the like.

The methods and processes described above, such as the process 700, can also be performed by the processor 801. In some embodiments, the process 700 can be implemented as a computer software program or a computer program product tangibly included in the computer readable medium, e.g., storage unit 808. In some embodiments, the computer program can be partially or fully loaded and/or embodied to the system/device 800 via ROM 802 and/or communication unit 809. The computer program includes computer executable instructions that are executed by the associated processor 801. When the computer program is loaded to RAM 803 and executed by the processor 801, one or more acts of the process 700 described above can be implemented. Alternatively, processor 801 can be configured via any other suitable manners (e.g., by means of firmware) to execute the process 700 in other embodiments.

In some example embodiments of the present disclosure, there is provided a computer program product comprising instructions which, when executed by a processor of an apparatus, cause the apparatus to perform steps of any one of the methods described above.

In some example embodiments of the present disclosure, there is provided a computer readable medium comprising program instructions for causing an apparatus to perform at least steps of any one of the methods described above. The computer readable medium may be a non-transitory computer readable medium in some embodiments.

In an eighth aspect, example embodiments of the present disclosure provide a computer readable medium comprising program instructions for causing an apparatus to perform at least the method in the second aspect described above. The computer readable medium may be a non-transitory computer readable medium in some embodiments.

Generally, various example embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of the example embodiments of the present disclosure are illustrated and described as block diagrams, flowcharts, or using some other pictorial representations, it will be appreciated that the blocks, apparatuses, systems, techniques, or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods/processes as described above. Generally, program modules include routines, programs, libraries, objects, classes, components, data structures, or the like that perform particular tasks or implement particular abstract types. The functionality of the program modules may be combined or split between program modules as desired in various embodiments. Computer-executable instructions for program modules may be executed within a local or distributed device. In a distributed device, program modules may be located in both local and remote storage media.

The computer readable medium may be a computer readable signal medium or a computer readable storage medium. A computer readable medium may include but is not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Computer program code for carrying out methods disclosed herein may be written in any combination of one or more programming languages. The program code may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a computer, partly on the computer, as a stand-alone software package, partly on the computer and partly on a remote computer or entirely on the remote computer or server. The program code may be distributed on specially-programmed devices which may be generally referred to herein as "modules". Software component portions of the modules may be written in any computer language and may be a portion of a monolithic code base, or may be developed in more discrete code portions, such as is typical in object-oriented computer languages. In addition, the modules may be distributed across a plurality of computer platforms, servers, terminals, mobile devices and the like. A given module may even be implemented such that the described functions are performed by separate processors and/or computing hardware platforms.

While operations are depicted in a particular order, this should not be understood as requiring that such operations be performed in the particular order shown or in sequential order, or that all illustrated operations be performed, to achieve desirable results. In certain circumstances, multi-tasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method comprising:
   determining a semantic correlation relationship between a plurality of feature categories, the semantic correlation relationship indicating respective degrees of semantic correlation between respective pairs of feature categories among the plurality of feature categories, wherein the determining the semantic correlation relationship comprises:
      identifying a set of named entities from a corpus, the corpus comprising a plurality of text sequences,
      classifying the set of named entities into a plurality of entity clusters, each of the plurality of entity clusters being associated with one of the plurality of feature categories, and
      determining the respective degrees of semantic correlation among the plurality of feature categories based on relative positioning of the plurality of entity clusters within the plurality of text sequences;
   obtaining at least two features classified in at least two of the plurality of feature categories for machine learning; and
   performing feature crossing on the at least two features based on the semantic correlation relationship, wherein the performing the feature crossing comprises:
      determining a target degree of semantic correlation between the at least two feature categories based on the semantic correlation relationship,
      in accordance with a determination that the target degree of semantic correlation exceeds a threshold degree of semantic correlation, applying a feature crossing operation on the at least two features to generate a crossed feature, and
      in accordance with a determination that the target degree of semantic correlation is below the threshold degree of semantic correlation, ceasing to apply the feature crossing operation on the at least two features.

2. The method of claim 1, wherein determining the semantic correlation relationship comprises:

transforming respective names of the plurality of feature categories into a plurality of embedding representations using a language model; and determining the respective degrees of semantic correlation based on respective similarities between the plurality of embedding representations.

3. The method of claim 1, wherein identifying the set of named entities comprises:

obtaining a named entity recognition model, the named entity recognition model being trained with a plurality of sample text sequences and first labeling information indicating named entities occurred in the plurality of sample text sequences; and identifying the set of named entities using the named entity recognition model.

4. The method of claim 1, wherein classifying the set of named entities comprises:

transforming the set of named entities into a set of embedding representations using a language model; and clustering the set of named entities based on respective similarities between the set of embedding representations.

5. The method of claim 1, wherein classifying the set of named entities comprises:

obtaining a classification model, the classification model being trained with a plurality of sample named entities and second labeling information, the second labeling information indicating a classification result of the plurality of sample named entities into the plurality of entity clusters; and classifying the set of named entities using the classification model.

6. The method of claim 1, wherein determining the respective degrees of semantic correlation based on the relative positioning of the plurality of named entities within the plurality of text sequences comprises:

for a first entity cluster and a second entity cluster of the plurality of clusters, determining a frequency of co-occurrence of a first named entity classified in the first entity cluster in relation to a second named entity classified in the second entity cluster within same text sequences of the plurality of text sequences; and determining, based on the frequency of co-occurrence, a degree of semantic correlation between a first feature category associated with the first entity cluster and a second feature category associated with the second entity cluster.

7. The method of claim 1, wherein determining the semantic correlation relationship comprises:

generating a relational graph to indicate the semantic correlation relationship, the relational graph comprising a plurality of vertexes representing the plurality of feature categories, and a plurality of edges connecting the plurality of vertexes, each of the plurality of edges indicating a degree of semantic correlation between two feature categories represented by two vertexes connected by the edge.

8. The method of claim 1, wherein the semantic correlation relationship indicates respective degrees of semantic correlation between respective pairs of feature categories among the plurality of feature categories; and wherein determining the target degree of semantic correlation comprises:

in accordance with a determination that more than two features classified in more than two feature categories are obtained, determining, from the semantic correlation relationship, at least two degrees of semantic correlation between at least two pairs of feature categories among the more than two feature categories, and determining the target degree of semantic correlation by combining the at least two degrees of semantic correlation.

9. A system, comprising:

at least one processor; and at least one memory communicatively coupled to the at least one processor and comprising computer-readable instructions that upon execution by the at least one processor cause the at least one processor to perform acts comprising:

determining a semantic correlation relationship between a plurality of feature categories, the semantic correlation relationship indicating respective degrees of semantic correlation between respective pairs of feature categories among the plurality of feature categories, wherein the determining the semantic correlation relationship comprises:

identifying a set of named entities from a corpus, the corpus comprising a plurality of text sequences, classifying the set of named entities into a plurality of entity clusters, each of the plurality of entity clusters being associated with one of the plurality of feature categories, and determining the respective degrees of semantic correlation among the plurality of feature categories based on relative positioning of the plurality of entity clusters within the plurality of text sequences;

obtaining at least two features classified in at least two of the plurality of feature categories for machine learning; and performing feature crossing on the at least two features based on the semantic correlation relationship, wherein the performing the feature crossing comprises:

determining a target degree of semantic correlation between the at least two feature categories based on the semantic correlation relationship, in accordance with a determination that the target degree of semantic correlation exceeds a threshold degree of semantic correlation, applying a feature crossing operation on the at least two features to generate a crossed feature, and in accordance with a determination that the target degree of semantic correlation is below the threshold degree of semantic correlation, ceasing to apply the feature crossing operation on the at least two features.

10. The system of claim 9, wherein determining the semantic correlation relationship comprises:

transforming respective names of the plurality of feature categories into a plurality of embedding representations using a language model; and determining the respective degrees of semantic correlation based on respective similarities between the plurality of embedding representations.

11. The system of claim 9, wherein identifying the set of named entities comprises:

obtaining a named entity recognition model, the named entity recognition model being trained with a plurality of sample text sequences and first labeling information indicating named entities occurred in the plurality of sample text sequences; and identifying the set of named entities using the named entity recognition model.

12. The system of claim 9, wherein classifying the set of named entities comprises:
    transforming the set of named entities into a set of embedding representations using a language model; and
    clustering the set of named entities based on respective similarities between the set of embedding representations.

13. The system of claim 9, wherein classifying the set of named entities comprises:
    obtaining a classification model, the classification model being trained with a plurality of sample named entities and second labeling information, the second labeling information indicating a classification result of the plurality of sample named entities into the plurality of entity clusters; and
    classifying the set of named entities using the classification model.

14. The system of claim 9, wherein determining the respective degrees of semantic correlation based on the relative positioning of the plurality of named entities within the plurality of text sequences comprises:
    for a first entity cluster and a second entity cluster of the plurality of clusters,
        determining a frequency of co-occurrence of a first named entity classified in the first entity cluster in relation to a second named entity classified in the second entity cluster within same text sequences of the plurality of text sequences; and
        determining, based on the frequency of co-occurrence, a degree of semantic correlation between a first feature category associated with the first entity cluster and a second feature category associated with the second entity cluster.

15. The system of claim 9 wherein the semantic correlation relationship indicates respective degrees of semantic correlation between respective pairs of feature categories among the plurality of feature categories; and
    wherein determining the target degree of semantic correlation comprises:
        in accordance with a determination that more than two features classified in more than two feature categories are obtained,
            determining, from the semantic correlation relationship, at least two degrees of semantic correlation between at least two pairs of feature categories among the more than two feature categories, and
            determining the target degree of semantic correlation by combining the at least two degrees of semantic correlation.

16. A non-transitory computer-readable storage medium, storing computer-readable instructions that upon execution by a computing device cause the computing device to perform acts comprising:
    determining a semantic correlation relationship between a plurality of feature categories, the semantic correlation relationship indicating respective degrees of semantic correlation between respective pairs of feature categories among the plurality of feature categories, wherein the determining the semantic correlation relationship comprises:
        identifying a set of named entities from a corpus, the corpus comprising a plurality of text sequences,
        classifying the set of named entities into a plurality of entity clusters, each of the plurality of entity clusters being associated with one of the plurality of feature categories, and
        determining the respective degrees of semantic correlation among the plurality of feature categories based on relative positioning of the plurality of entity clusters within the plurality of text sequences;
    obtaining at least two features classified in at least two of the plurality of feature categories for machine learning; and
    performing feature crossing on the at least two features based on the semantic correlation relationship, wherein the performing the feature crossing comprises:
        determining a target degree of semantic correlation between the at least two feature categories based on the semantic correlation relationship,
        in accordance with a determination that the target degree of semantic correlation exceeds a threshold degree of semantic correlation, applying a feature crossing operation on the at least two features to generate a crossed feature, and
        in accordance with a determination that the target degree of semantic correlation is below the threshold degree of semantic correlation, ceasing to apply the feature crossing operation on the at least two features.

17. The non-transitory computer-readable storage medium of claim 16, wherein the determining the semantic correlation relationship comprises:
    transforming respective names of the plurality of feature categories into a plurality of embedding representations using a language model; and
    determining the respective degrees of semantic correlation based on respective similarities between the plurality of embedding representations.

18. The non-transitory computer-readable storage medium of claim 16, wherein the identifying the set of named entities comprises:
    obtaining a named entity recognition model, the named entity recognition model being trained with a plurality of sample text sequences and first labeling information indicating named entities occurred in the plurality of sample text sequences; and
    identifying the set of named entities using the named entity recognition model.

19. The non-transitory computer-readable storage medium of claim 16, wherein the classifying the set of named entities comprises:
    transforming the set of named entities into a set of embedding representations using a language model; and
    clustering the set of named entities based on respective similarities between the set of embedding representations.

20. The non-transitory computer-readable storage medium of claim 16, wherein the determining the semantic correlation relationship comprises:
    generating a relational graph to indicate the semantic correlation relationship, the relational graph comprising a plurality of vertexes representing the plurality of feature categories, and a plurality of edges connecting the plurality of vertexes, each of the plurality of edges indicating a degree of semantic correlation between two feature categories represented by two vertexes connected by the edge.

* * * * *